United States Patent
Zhang

(10) Patent No.: US 8,244,213 B2
(45) Date of Patent: Aug. 14, 2012

(54) COMMUNICATION DEVICE AND METHOD FOR MANAGING SERVICE SHARING

(75) Inventor: Xi-Bo Zhang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 360 days.

(21) Appl. No.: 12/621,635

(22) Filed: Nov. 19, 2009

(65) Prior Publication Data

US 2010/0216431 A1    Aug. 26, 2010

(30) Foreign Application Priority Data

Feb. 24, 2009   (CN) .......................... 2009 1 0300532

(51) Int. Cl.
H04M 1/66        (2006.01)

(52) U.S. Cl. ..................................... 455/411; 455/414.1

(58) Field of Classification Search .................. 455/558, 455/411, 414.1–414.4, 432.2, 433, 552.1, 455/556.1, 41.2, 426.1, 426.2, 461, 462
See application file for complete search history.

(56) References Cited

U.S. PATENT DOCUMENTS

| | | | | |
|---|---|---|---|---|
| 6,639,973 | B1 * | 10/2003 | Wheeler et al. | 379/88.18 |
| 8,082,326 | B2 * | 12/2011 | Sano | 709/219 |
| 2002/0068543 | A1 * | 6/2002 | Shah | 455/351 |
| 2007/0213039 | A1 * | 9/2007 | Skog | 455/414.3 |
| 2008/0009272 | A1 * | 1/2008 | Toledano | 455/414.1 |
| 2008/0096507 | A1 * | 4/2008 | Erola | 455/187.1 |
| 2008/0242280 | A1 * | 10/2008 | Shapiro et al. | 455/414.3 |
| 2008/0268774 | A1 * | 10/2008 | Porter et al. | 455/3.06 |
| 2008/0307067 | A1 * | 12/2008 | Cisler et al. | 709/218 |
| 2008/0307504 | A1 * | 12/2008 | Cisler et al. | 726/4 |
| 2009/0011743 | A1 * | 1/2009 | Johanson et al. | 455/414.1 |
| 2009/0164583 | A1 * | 6/2009 | Zhu | 709/205 |
| 2010/0042717 | A1 * | 2/2010 | Strandell et al. | 709/224 |
| 2010/0076946 | A1 * | 3/2010 | Barker et al. | 707/705 |
| 2010/0144318 | A1 * | 6/2010 | Cable | 455/412.1 |

* cited by examiner

Primary Examiner — Kamran Afshar
Assistant Examiner — Khawar Iqbal
(74) Attorney, Agent, or Firm — Altis Law Group, Inc.

(57) ABSTRACT

A communication device and method for managing service sharing include reading a phone number of the service request communication device if the message is a service request message, sending a service sharing list to the service request communication device if the phone number of the service request communication device is an authorized phone number, sending operation instruction corresponding to the request service sharing to the service request communication device, sharing the request service with the service request communication device.

15 Claims, 4 Drawing Sheets

| Service identifier | Service name |
|---|---|
| 1. | service A |
| 2. | service B |
| 3. | service C |
| 4. | service D |
| ⋮ | |

Service sharing list

FIG. 4

COMMUNICATION DEVICE AND METHOD FOR MANAGING SERVICE SHARING

BACKGROUND

1. Technical Field

Embodiments of the present disclosure relate to managing data, and more particularly to a communication device and method for managing service sharing.

2. Description of Related Art

Nowadays, communication devices are being widely used by more and more people. This development has created a great demand for providing service sharing between communication devices, for example, call forwarding service, information sharing service. Thus, how to provide shared services between communication devices is highly desired.

BRIEF DESCRIPTION OF THE DRAWINGS

FIG. 4 is a schematic diagram of one embodiment of a service sharing list.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
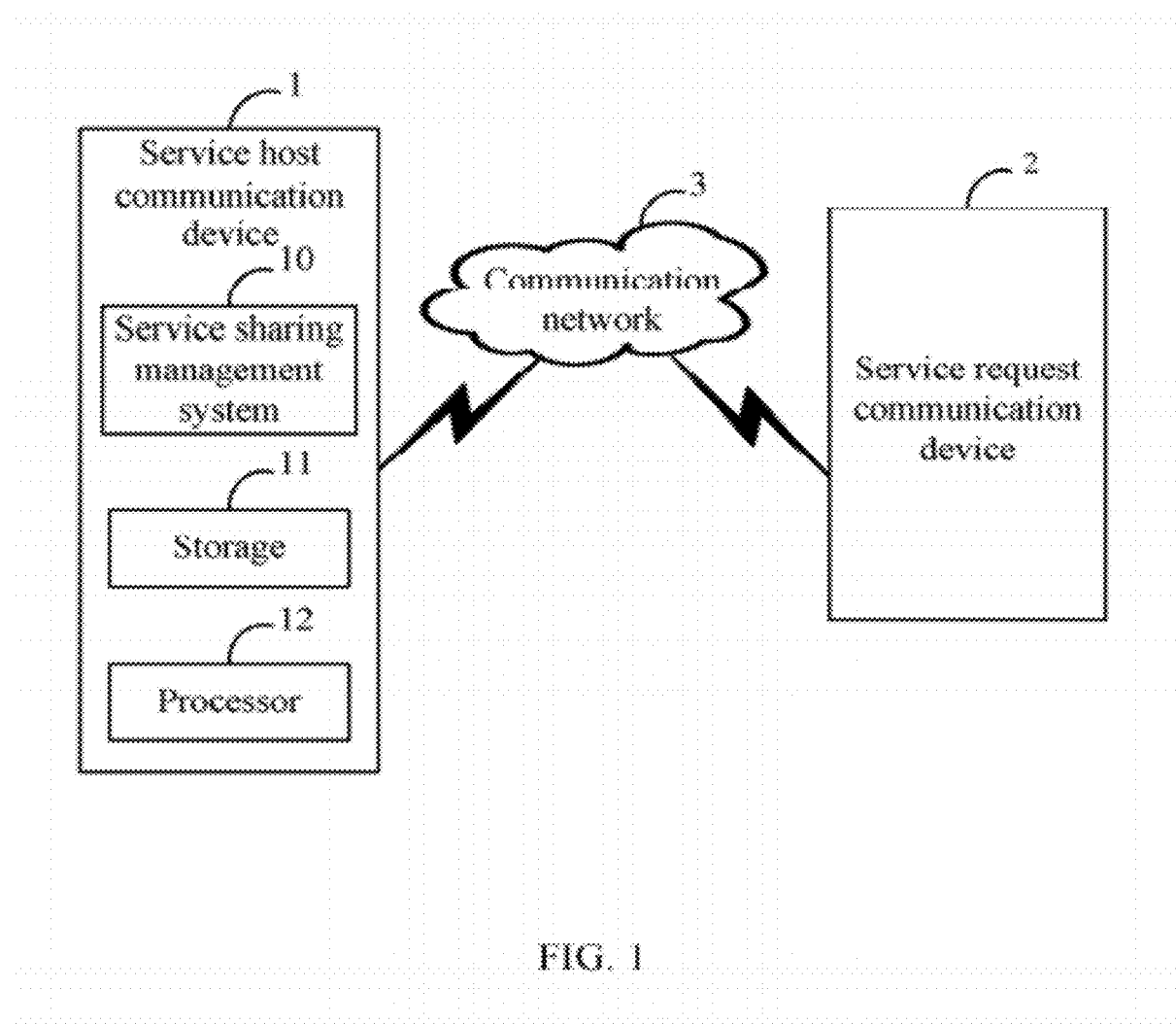
FIG. 1 is a block diagram of one embodiment of a communication device including a service sharing management system.

FIG. 1 is a block diagram of one embodiment of a service host communication device 1 including a service sharing management system 10. The service sharing management system 10 may be used to share a shareable service by the service host communication device 1 with a service request communication device 2. The shareable service may include a service of inquiring information in the service host communication device 1, a service of setting a call forwarding function, for example. A request service is one of the shareable services that the service request communication device 2 requests to share.

The service host communication device 1 communicates with the service request communication device 2 via a communication network 3. The service host communication device 1 shares one or more shareable services with the service request communication device 2. The service host communication device 1 and the service request communication device 2 may be mobile phones, personal digital assistants (PDAs), handheld computers, or any other kind of computing devices. The communication network 3 may be the global system for mobile communication (GSM) network, or the general packet radio service (GPRS) network, for example.

In one embodiment as shown in FIG. 1, the service host communication device 1 may further include a non-transitory computer-readable storage medium ("storage" in the Drawing and hereinafter) 11 and a processor 12. The storage 11 stores one or more programs, such as programs of an operating system, other applications of the service host communication device 1, and various kinds of data, such as a service sharing list, service operation instruction, messages, phone numbers, for example. In one embodiment, the storage 11 may be a memory of the service host communication device 1 or an external storage card, such as a memory stick, a subscriber identification module (SIM) card, a smart media card, a compact flash card, or any other type of memory card. The processor 12 executes one or more computerized operations of the service host communication device 1 and other applications, to provide functions of the service host communication device 1.

Figure 2:
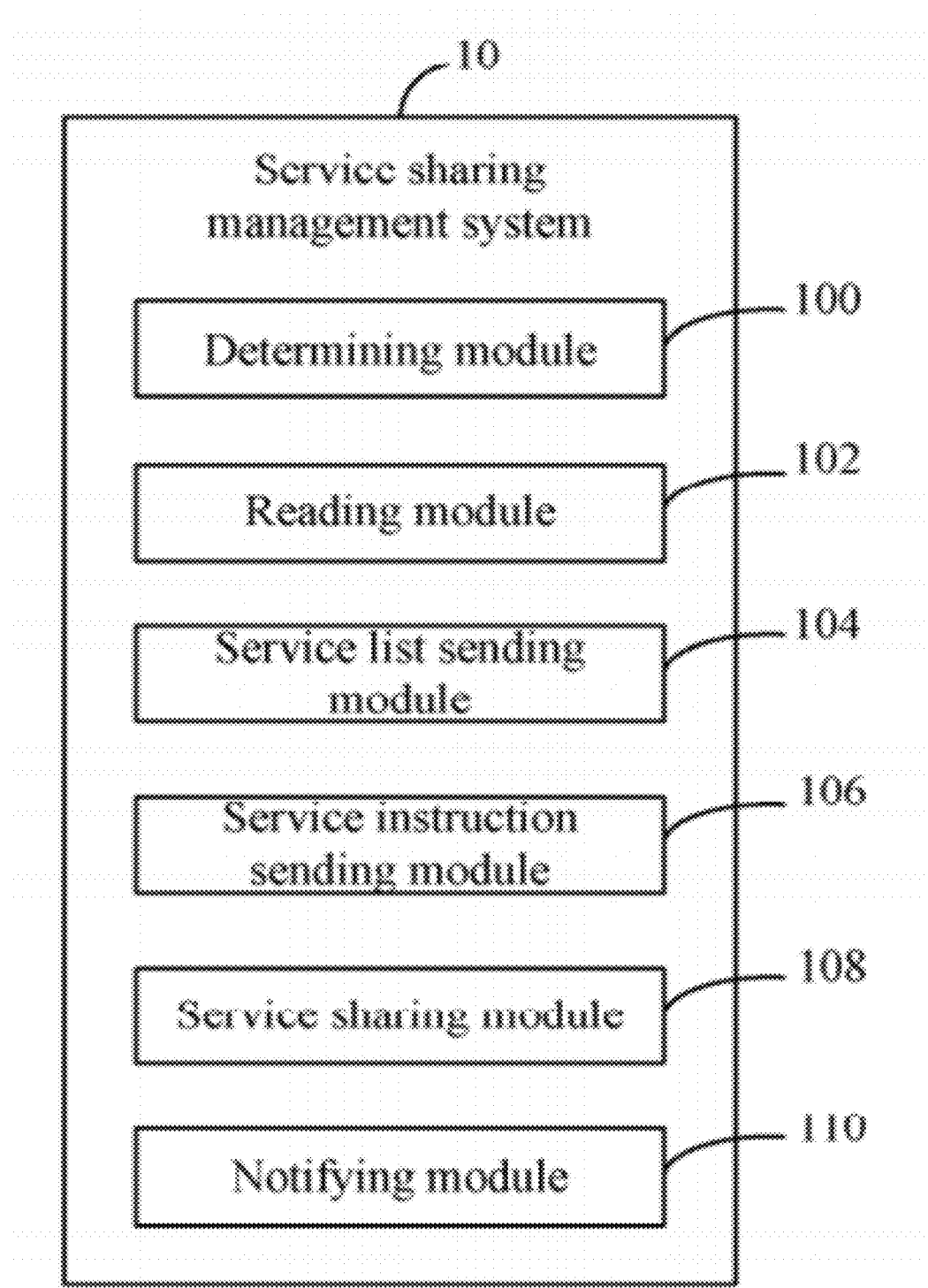
FIG. 2 is a block diagram of one embodiment of the service sharing management in FIG. 1.

FIG. 2 is a block diagram of one embodiment of the service sharing management system 10. In one embodiment, the communication data managing system 10 includes a determining module 100, a reading module 102, a service list sending module 104, a service instruction sending module 106, a service sharing module 108, and a notifying module 110. The modules 100, 102, 104, 106, 108, and 110 may comprise one or more computerized codes to be executed by the processor 12 to perform one or more operations of the service host communication device 1.

The determining module 100 is operable to determine whether the service host communication device 1 receives a message from the service request communication device 2. The message may be a common short message including text, images, audio, and video, or a service request message including a phone number of the service host communication device 1.

The determining module 100 also determines whether the received message is a service request message. In one embodiment, the service request message may include a phone number of the service host communication device 1. For example, if the message includes a phone number of the service host communication device 1, the determining module 100 determines that the message is a service request message. Otherwise, if the message does not include a phone number of the service host communication device 1, the determining module 100 determines that the message is not the service request message.

In one embodiment, at least one authorized phone number of at least one authorized communication device is predetermined recorded in the storage 11. The reading module 102 reads a phone number of the service request communication device 2 if the message is a service request message.

The determining module 100 further determines whether the phone number of the service request communication device 2 is an authorized phone number. The determining module 100 determines that the phone number of the service request communication device 2 is an authorized phone number if the phone number of the service request communication device 2 matches the at least one authorized phone number recorded in the storage 11 of the service host communication device 1. If the phone number of the service request communication device 2 does not match the at least one authorized phone number recorded in the storage 11 of the service host communication device 1, the determining module 100 determines that the phone number of the service request communication device 2 is not an authorized phone number.

In another embodiment, the service request message may further include an authorization code. The determining module 100 determines that the phone number of the service request communication device 2 is an authorized phone number if an authentication code in the service request message matches a predetermined authentication code in the service host communication device 1. The determining module 100 also determines that the phone number of the service request communication device 2 is not authorized phone number if the authentication code does not match the predetermined authentication code in the service host communication device 1.

If the phone number of the service request communication device 2 is not an authorized phone number, the notifying module 110 notifies the service request communication device 2.

If the phone number of the service request communication device 2 is an authorized phone number, the service list sending module 104 sends a service sharing list in the storage 11 to the service request communication device 2. The service sharing list includes a plurality of service names and corresponding service identifiers of the services to be shared. As shown in FIG. 4, the service list includes a service A and a corresponding service identifier "1," a service B and a corresponding service identifier "2," a service C and a corresponding service identifier "3," a service D and a corresponding service identifier "4."

The service request communication device 2 receives the service list from the service host communication device 1, selects an identifier of a request service, and then sends back the identifier of the request service to the service host communication device 1.

The service instruction sending module 106 receives the service identifier from the service request communication device 2, and sends a operation instruction corresponding to the service identifier to the service request communication device 2. Each of the services in the service list has an operation instruction, the operation instruction includes a instruction code and detailed directions explaining how to share the service. In one embodiment, a service list includes a service A and a corresponding service identifier "1," the service A includes operation instruction that "return #21# to request service A," "#21#" is the instruction code. If the service instruction sending module 106 receives the service identifier "1" from the service request communication device 2, then, the service instruction sending module 106 sends operation instruction "return #21# to request service A" to the service request communication device 2.

The service request communication device 2 receives the operation instruction from the service host communication device 1, identifies the instruction code in the operation instruction, and sends back the instruction code to the service host communication device 1. In one embodiment, the service request communication device 2 receives the operation instruction "return #21# to request service A" from the service host communication device 1, then, the service request communication device 2 send back instruction code "#21#" to the service host communication device 1.

The service sharing module 108 receives the instruction code from the service request communication device 2, and shares the request service with the service request communication device 2.

Figure 3:
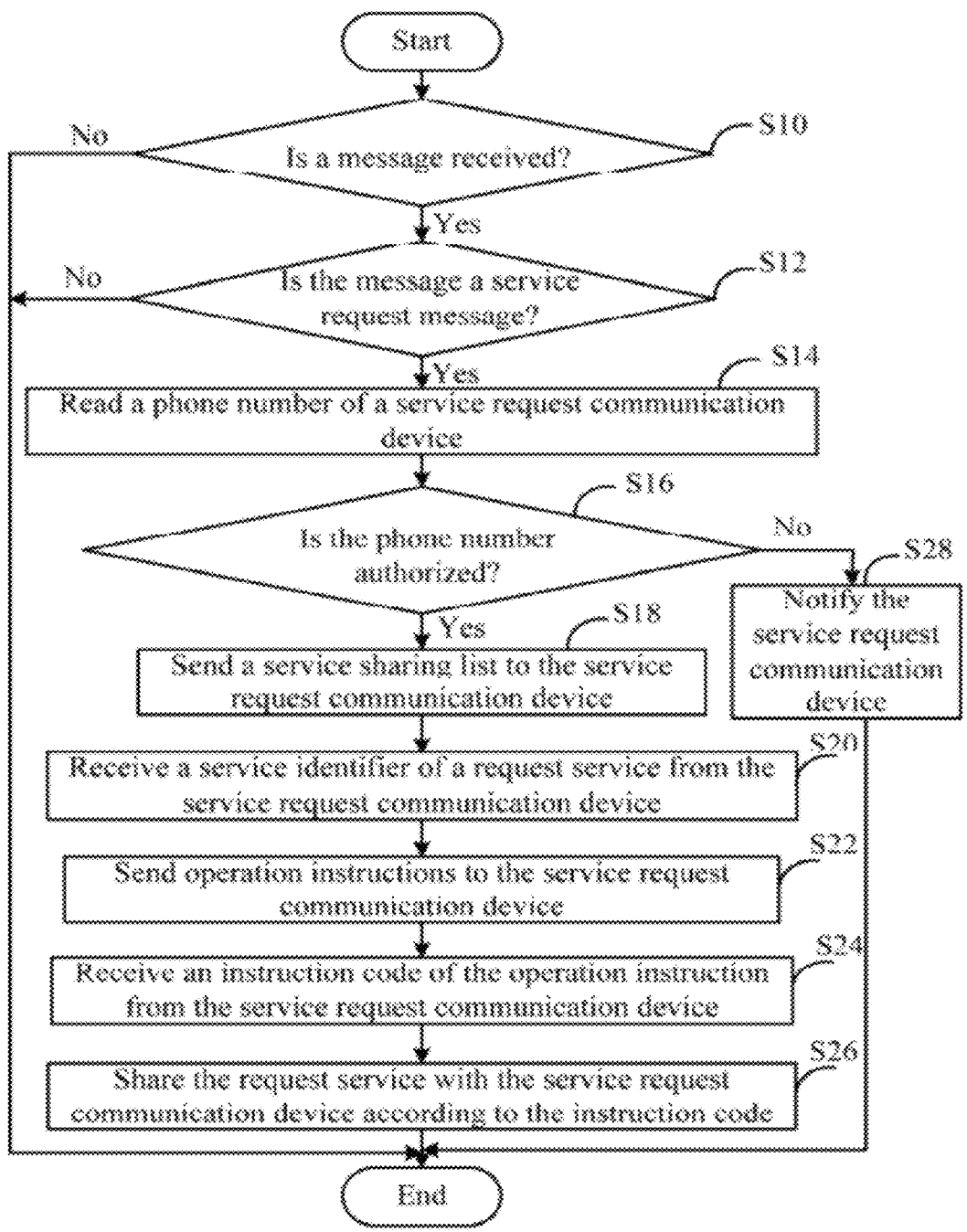
FIG. 3 is a flowchart of one embodiment of a method for service sharing management of the communication device of FIG. 1.

FIG. 3 is a flowchart of one embodiment of a method for service sharing management of the service host communication device 1. Depending on the embodiment, additional blocks may be added, others removed, and the ordering of the blocks may be replaced.

In block S10, the determining module 100 determines whether the service host communication device 1 receives a message from the service request communication device 2.

In block S12, if the service host communication device 1 receives a message, the determining module 100 also determines whether the received message is a service request message. If the message includes a phone number of the service host communication device 1, the determining module 100 determines that the message is a service request message. Otherwise, if the message does not include a phone number of the service host communication device 1, the determining module 100 determines that the message is not a service request message.

In block S14, the reading module 102 reads a phone number of the service request communication device 2 if the message is a service request message. At least one authorized phone number of at least one authorized communication device is predetermined recorded in the storage 11.

In block S16, the determining module 100 further determines whether the phone number of the service request communication device 2 is an authorized phone number.

In block S28, if the phone number of the service request communication device 2 is not an authorized phone number, the notifying module 110 notifies the service request communication device 2. In block S18, if the phone number of the service request communication device 2 is an authorized phone number, the service list sending module 104 sends a service sharing list in the storage 11 to the service request communication device 2. The service request communication device 2 receives the service list from the service host communication device 1, selects an identifier of a request service, and then sends back the identifier of the request service to the service host communication device 1.

In block S20, the service instruction sending module 106 receives service identifier to share from the service request communication device 2.

In block S22, the service instruction sending module 106 sends operation instruction corresponding to the request service to the service request communication device 2. The service request communication device 2 receives the operation instruction from the service host communication device 1, identifies an instruction code in the operation instruction, and sends back the instruction code to the service host communication device 1.

In block S24, the service sharing module 108 receives the instruction code of the operation instruction from the service request communication device 2.

In block S26, the service sharing module 108 shares the request service with the service request communication device 2 according to the instruction code.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, the communication device comprising:
   a storage operable to store a service sharing list comprising a plurality of services, each service in the service sharing list comprising a service identifier and a service name, wherein the plurality of services comprises inquiring information of the communication device, and setting a call forwarding function;

at least one processor; and one or more programs stored in the storage and being executable by the at least one processor, the one or more programs comprising:

a determining module operable to determine if the communication device receives a message from the service request communication device, and determine whether the received message is a service request message according to whether a phone number of the communication device is comprised in the received message;

a reading module operable to read the phone number of the service request communication device;

the determining module also operable to determine whether the phone number of the service request communication device is an authorized phone number;

a service list sending module operable to send the service sharing list in the storage to the service request communication device if the phone number of the service request communication device is the authorized phone number;

a service instruction sending module operable to receive a service identifier of a request service to be shared from the service request communication device, and send operation instruction corresponding to the request service to the service request communication device;

a service sharing module operable to receive an instruction code of the operation instruction from the service request communication device, and share the request service with the service request communication device.

2. The communication device according to claim 1, wherein the one or more programs further comprise:

a notifying module operable to notify the service request communication device if the phone number of the service request communication device is not the authorized phone number.

3. The communication device according to claim 1, wherein the determining module is further operable to determine that the message is a service request message if the message comprises a phone number of the communication device.

4. The communication device according to claim 1, wherein the determining module is further operable to determine that the phone number of the service request communication device is an authorized phone number if the phone number of the service request communication device matches at least one authorized phone number recorded in the storage of the service host communication device; determine that the phone number of the service request communication device is not an authorized phone number if the phone number of the service request communication device does not match the at least one authorized phone number recorded in the storage of the service host communication device.

5. The communication device according to claim 1, wherein the determining module is further operable to determine that the phone number of the service request communication device is an authorized phone number if an authentication code in the service request message matches a predetermined authentication code in the service host communication device; determine that the phone number of the service request communication device is not authorized phone number if the authentication code does not match the predetermined authentication code in the service host communication device.

6. A service sharing management method for a communication device, the method comprising:

storing a service sharing list into a storage of the communication device, wherein the service sharing list comprises a plurality of services, each service comprising a service identifier and a service name, the plurality of services comprising inquiring information of the communication device, and setting a call forwarding function;

determining if the communication device receives a message from the service request communication device, and determining whether the received message is a service request message according to whether a phone number of the communication device is comprised in the received message;

reading the phone number of the service request communication device;

determining if the phone number of the service request communication device is an authorized phone number;

sending a service sharing list to the service request communication device if the phone number of the service request communication device is the authorized phone number;

receiving a service identifier of a request service to be shared in the service sharing list from the service request communication device;

sending operation instruction corresponding to the request service sharing to the service request communication device;

receiving an instruction code from the service request communication device; and sharing the request service with the service request communication device.

7. The method according to claim 6, further comprising:

notifying the service request communication device if the phone number of the service request communication device is not the authorized phone number.

8. The method according to claim 6, wherein the message is determined as a service request message if the message comprises a phone number of the communication device.

9. The method according to claim 6, wherein the phone number of the service request communication device is determined an authorized phone number if the phone number of the service request communication device matches at least one authorized phone number recorded in the storage of the service host communication device; the phone number of the service request communication device is determined not an authorized phone number if the phone number of the service request communication device does not match at least one authorized phone number recorded in the storage of the service host communication device.

10. The method according to claim 6, wherein the phone number of the service request communication device is determined an authorized phone number if an authentication code in the service request message matches a predetermined authentication code in the service host communication device; the phone number of the service request communication device is determined not authorized phone number if the authentication code does not match the predetermined authentication code in the service host communication device.

11. A non-transitory storage medium having stored thereon instructions that, when executed by a processor, causing the processor to perform a service sharing managing method for a communication device, the method comprising:

storing a service sharing list into a storage of the communication device, wherein the service sharing list comprises a plurality of services, each service comprising a service identifier and a service name, the plurality of services comprising inquiring information of the communication device, and setting a call forwarding function;

determining if the communication device receives a message from the service request communication device, and determining whether the received message is a service request message according to whether a phone number of the communication device is comprised in the received message;

reading the phone number of the service request communication device;

determining if the phone number of the service request communication device is an authorized phone number;

sending a service sharing list to the service request communication device if the phone number of the service request communication device is the authorized phone number;

receiving a service identifier of a request service to be shared in the service sharing list from the service request communication device;

sending operation instruction corresponding to the request service sharing to the service request communication device;

receiving an instruction code from the service request communication device; and sharing the request service with the service request communication device.

12. The medium according to claim 11, further comprising:
notifying the service request communication device if the phone number of the service request communication device is not the authorized phone number.

13. The medium according to claim 11, wherein the message is determined a service request message if the message comprises a phone number of the communication device.

14. The medium according to claim 11, wherein phone number of the service request communication device is determined an authorized phone number if the phone number of the service request communication device matches at least one authorized phone number recorded in the storage of the service host communication device; the phone number of the service request communication device is determined not an authorized phone number if the phone number of the service request communication device does not match at least one authorized phone number recorded in the storage of the service host communication device.

15. The medium according to claim 11, wherein the phone number of the service request communication device is determined an authorized phone number if an authentication code in the service request message matches a predetermined authentication code in the service host communication device; the phone number of the service request communication device is determined not authorized phone number if the authentication code does not match the predetermined authentication code in the service host communication device.

* * * * *